Feb. 13, 1962 C W. MUSSER 3,020,775
ANTIBACKLASH DEVICES
Filed May 12, 1960 2 Sheets-Sheet 1
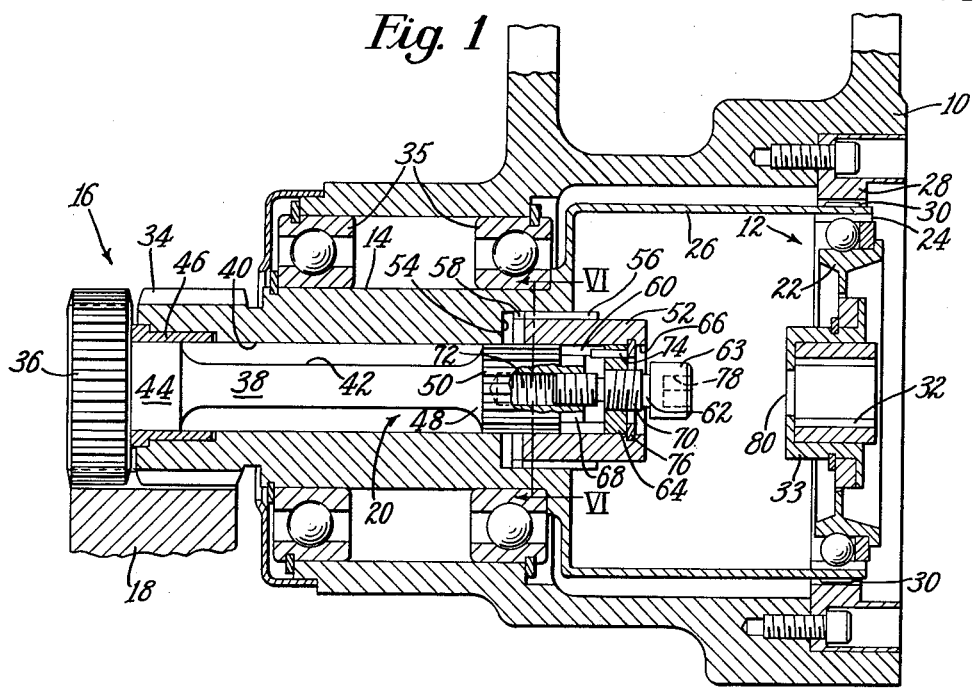
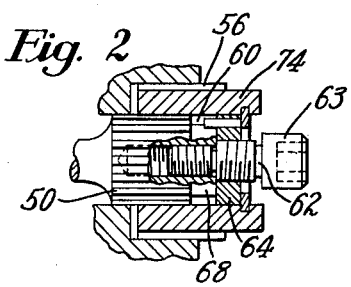
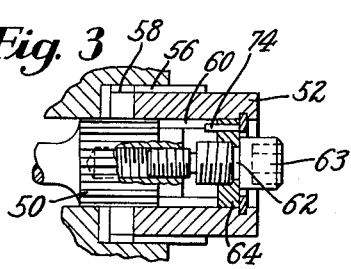
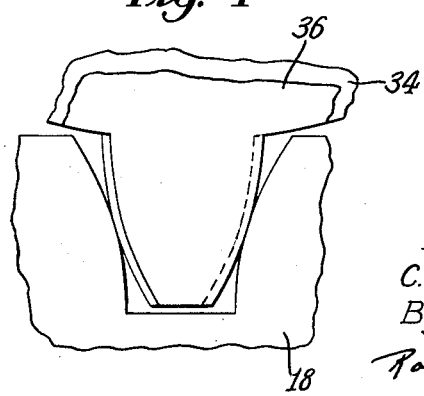
*Inventor*
C. Walton Musser
By his Attorney
Robert L. Geist Feb. 13, 1962     C W. MUSSER     3,020,775
ANTIBACKLASH DEVICES
Filed May 12, 1960     2 Sheets-Sheet 2
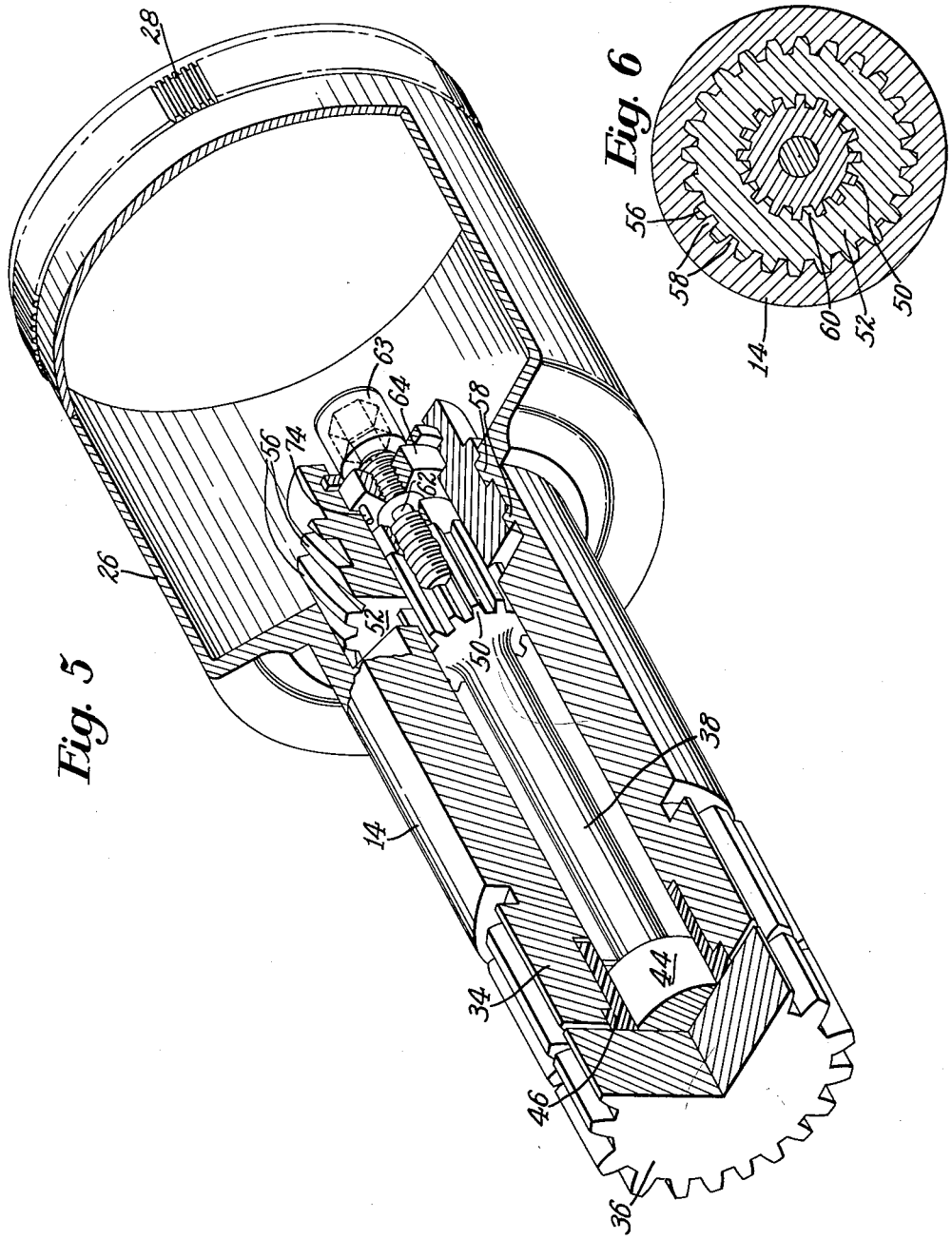

ABSTRACT

United States Patent Office 3,020,775
Patented Feb. 13, 1962

3,020,775
ANTIBACKLASH DEVICES
C Walton Musser, Beverly, Mass., assignor to United Shoe Machinery Corporation, Flemington, N.J., a corporation of New Jersey
Filed May 12, 1960, Ser. No. 28,632
3 Claims. (Cl. 74—440)

This invention relates to antibacklash devices and is herein illustrated, by way of example, as embodied in a gear reduction mechanism having means for controlling backlash at the output.

In many gearing installations, particularly those involving the desirability of smooth operation in starting and in reversing direction of motion, considerable difficulty has been experienced in controlling backlash or play between the teeth of mating gears. Some of the means heretofore used in overcoming backlash comprise split gear devices in which two associated gears are relatively movable through a small angle to effect close engagement with the teeth of a driven gear. Such devices generally necessitate the use of means for initially adjusting the angularity of the component gears, of means for locking the gears in adjusted relation, as well as means for subsequent adjustment desirable because of wear or varying load requirements.

In view of the foregoing it is an object of my invention to provide a novel antibacklash device which is comparatively simple in construction and highly effective in operation.

It is a further object of the invention to provide a novel antibacklash device which is readily adjustable to vary the pressure applied to mating gear tooth surfaces, and for securely locking the gears in adjusted position.

Preferably, and, as illustrated, the mechanism comprises a transmission having a hollow drive shaft carrying a split output gear composed of two pinions. The teeth of the pinions are of similar size and shape and are in meshing relation with the teeth of a driven gear. One of the pinions is preferably fixed to the shaft and the other is secured to a rod rotatably mounted in the shaft in such manner that the pinions can be adjusted angularly relatively to each other to take up any slack between the pinion teeth and the mating teeth of the driven gear.

The invention provides mechanism for making such an adjustment, comprising a nut having helical teeth engaging teeth in the inner wall of the hollow shaft and being splined to the rod so that axial movement of the nut results in angular movement of the rod and consequent angular movement of one of the pinions relatively to the other. The adjustment is conveniently made by means of an adjusting screw, carried by the nut and threaded into the rod, so that upon rotation of the screw the rod and nut are moved relatively to each other axially of the shaft.

These and other objects and features of the invention are described in the following specification, disclosed in the accompanying drawings, and are pointed out in the claims.

In the drawings,

FIG. 1 is a longitudinal cross sectional view of one embodiment of my invention;

FIGS. 2 and 3 are longitudinal cross sectional views of portions of the sleeve and torsion rod in two different adjusted positions;

FIG. 4 is a fragmental end view of portions of the pinions and driven gear illustrating the operative engagement of the pinions;

FIG. 5 is a perspective view on an enlarged scale and partly in section of the mechanism shown in FIG. 1; and FIG. 6 is a cross sectional view on an enlarged scale taken along line VI—VI of FIG. 1.

In its preferred embodiment the invention is shown in connection with a power transmission mechanism comprising a casing 10, FIG. 1, containing a gear reduction unit 12 having an output shaft 14 carrying a split gear 16 engaging a driven or bull gear 18, together with an antibacklash adjusting device 20.

The reduction unit comprises a wave generator 22 in engagement with a ball race 24 within an enlarged portion 26 of the shaft 14, and a ring gear 28 fixedly secured to the casing 10 and making toothed engagement at 30 with the shaft, whereby the latter is rotated under the action of the wave generator. The generator itself is driven through a spline 32, forming part of its hub 33, by means of a motor not shown. The reduction unit per se is not part of the present invention, and for further details concerning it, reference may be had to United States Letters Patent No. 2,906,143, granted September 29, 1959, upon application filed in my name.

The outer portion of the shaft 14 is mounted in bearings 35. The split gear 16 is carried at the outer end of the shaft 14 and comprises a main pinion 34 integral with the shaft and an auxiliary pinion 36 integral with a torsion rod 38 rotatively positioned within a bore 40 in the shaft 14. The torsion rod has an attenuated central portion 42 terminating in an enlarged cylindrical portion 44 engaging a bushing 46 within the bore near its outer end. Near the inner end of the torsion rod is an enlargement 48 provided with a spline 50 the teeth of which extend parallel to the axis of the bore 40 of the shaft.

By rotating the spline 50 the rod 38, and consequently the pinion 36, can be rotated angularly relatively to the pinion 34 to take up the slack between the gear 16 and the bull gear 18 as shown in FIG. 4.

The means for rotating the spline 50 comprises a hollow sleeve 52 mounted in a bore 54 in the shaft 14 and having external helical teeth 56 in engagement with internal teeth 58 in the bore, as best shown in FIG. 5. The sleeve 52 has an internal spline 60 meshing with the spline 50. This arrangement is such that relative movement axially between the splines 50 and 60 results in angular movement of the sleeve relatively to the shaft 14 and consequent angular movement of the torsion rod 38 relatively to the shaft together with similar movement of the pinion 36 with respect to the pinion 34.

Means for effecting relative axial movements of the sleeve and torsion rod comprises an adjusting screw 62, FIGS. 1, 2 and 3, which is threaded through a nut 64, within a bore 66 in the inner end portion of the sleeve 52 adjacent to the spline 60, and into the interior of the spline 50 through a boss 68 integral with the spline. The portion of the screw 62 extending through the nut 64 is enlarged and is provided with coarse left hand threads 70. That portion of the screw extending through the boss 68 is of smaller diameter and is provided with right hand threads 72 of lesser pitch than threads 70.

In order to prevent rotation of the nut 64 relatively to the sleeve 52, the nut is provided with a stop pin 74 which when the parts are assembled is inserted between two of the teeth of the internal spline 60 of the sleeve. Axial movement of the nut 64 relatively to the sleeve is prevented by means of a snap ring 76.

In order to facilitate adjustment of the screw 62 the latter is provided with a head 63 having a hexagonal socket 78 which can be readily reached by a tool passing through the spline 32 and an opening 80 in the wave generator 22.

In assembling the parts, with the gear 18 disconnected, the sleeve 52 is positioned near its inner limit of movement, the nut 64 is inserted into the sleeve, and the screw 62 threaded into the nut 64 and the spline 50 until the head 63 of the screw is in engagement with the nut as shown in FIG. 3. The teeth of the pinion 36 are alined with those of the pinion 34, further adjustment of the screw 62 and sleeve 52 being made if necessary. The stop pin 74 is then inserted in a groove of the internal spline 60 to lock the nut for rotation with the sleeve, and the snap ring 76 is mounted to secure the nut against axial movement relatively to the sleeve.

The bull gear 18 can then be intermeshed with the pinions on the drive shaft and the screw 62 is turned in a direction to draw the rod 38 and the sleeve 52 toward each other thus effecting rotation of the sleeve in the shaft and a twisting of the rod 38 which advances the pinion 36 angularly relatively to the pinion 34 producing the desired take up of play between the teeth of the pinions and the teeth of the bull gear 18, the limiting position being reached when the boss 68 of the spline 50 acting as a stop bears against the nut 64 as shown in FIG. 2.

It is to be noted that the screw 62 can be adjusted for various desired tooth loadings, the maximum torque being determined by the outward position of the sleeve when the boss is in engagement with the nut. The torsion rod is in relaxed position with the teeth of the pinions in alinement when the nut is in engagement with the head 63 of the adjusting screw.

Angular adjustment of the pinion 36 is readily attained by rotation of the screw 62 which moves the sleeve 52 axially relatively to the spline 50 causing rotation of the sleeve and with it the spline. However, when the shaft 14 is under load the friction between the teeth of the various cooperating members resists any tendency to shift the sleeve. Thus the sleeve is locked in its adjusted position.

Having thus described my invention what I claim as new and desire to secure by Letters Patent of the United States is:

1. An antibacklash device comprising a drive shaft, a split gear on the shaft adapted for engagement with a gear to be driven, the split gear having a first gear element secured to the shaft and a second gear element mounted on the shaft for angular movement relatively to the first gear element, a torsion member carried by the shaft for supporting the second gear element, a sleeve mounted on the shaft and having helical teeth engaging corresponding teeth on the shaft, an axial spline on the torsion member engaging the sleeve to provide for relative axial movement between the member and sleeve and for angular movement of the torsion member with the sleeve, a nut in the sleeve, an adjusting screw making threaded connections with the nut and member whereby rotation of the screw effects relative axial movement of the sleeve and torsion member thereby effecting relative angular movement of the first and second gear elements.

2. An antibacklash device comprising a shaft, a first pinion and a second pinion carried by the shaft, the first pinion being mounted directly upon the shaft, the second pinion being mounted for angular movements relatively to the first pinion, means for mounting the second pinion including a torsion rod slidably mounted in a bore in the shaft, a sleeve screw threaded to the shaft for rotative and axial movements relatively to the shaft, the torsion rod having an axially extending spline engaging the sleeve, a nut in the sleeve, and an adjusting screw having right and left hand thread connections with the nut and rod for effecting relative movements of the rod and sleeve axially of the shaft in producing relative angular movements of the two pinions.

3. An antibacklash device comprising a shaft, a first pinion and a second pinion carried by the shaft, the first pinion being mounted directly upon the shaft, the second pinion being mounted for angular movements relatively to the first pinion, means mounting the second pinion including a torsion rod mounted in a bore in the shaft, a sleeve threaded to the shaft for rotative and axial movements relatively to the shaft, the torsion rod having an axially extending spline engaging the sleeve, a nut in the sleeve, an adjusting screw having right and left hand thread connections with the nut and rod for effecting relative movements of the rod and sleeve axially of the shaft in producing relative angular movements of the two pinions, and stops carried by the adjusting screw and rod for engaging the nut to limit relative angular movements of the pinions.

References Cited in the file of this patent

UNITED STATES PATENTS

| | | |
|---|---|---|
| 2,163,836 | Haas | June 27, 1939 |
| 2,429,067 | McDonald | Oct. 14, 1947 |
| 2,641,937 | Erhardt et al. | June 16, 1953 |
| 2,896,466 | Wiseman | July 28, 1959 |

FOREIGN PATENTS

| | | |
|---|---|---|
| 596,082 | Germany | Apr. 26, 1934 |